UNITED STATES PATENT OFFICE.

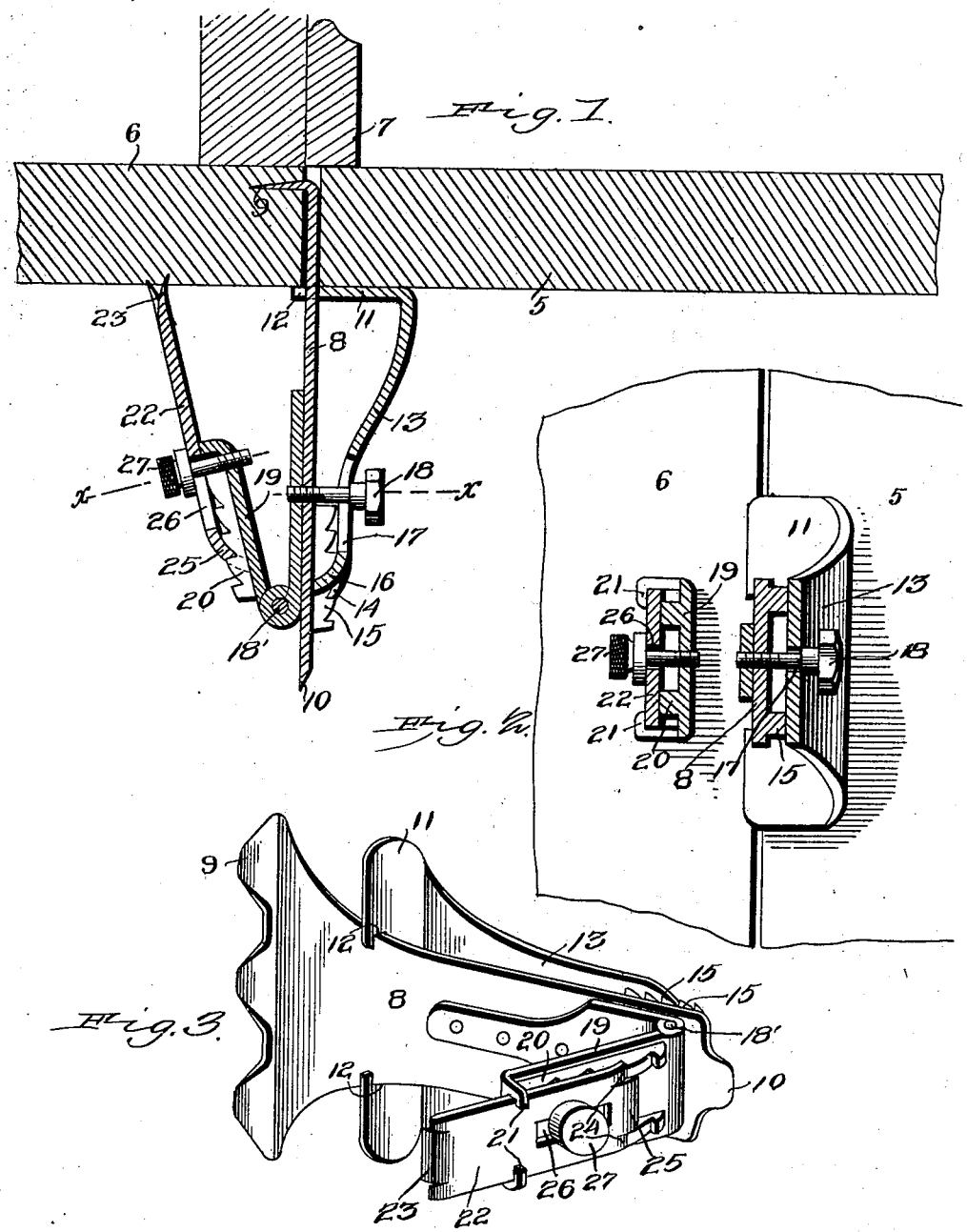

HECTOR PRUD'HOMME, OF MANCHESTER, NEW HAMPSHIRE.

DOOR-SECURER.

SPECIFICATION forming part of Letters Patent No. 710,118, dated September 30, 1902.

Application filed February 27, 1902. Serial No. 95,980. (No model.)

*To all whom it may concern:*

Be it known that I, HECTOR PRUD'HOMME, a citizen of the United States, residing at Manchester, in the county of Hillsboro and State of New Hampshire, have invented a new and useful Door-Securer, of which the following is a specification.

This invention relates to devices employed for temporarily securing doors, and has for its object the production of an implement which may be readily and quickly applied and which may be adapted to any style of door and which may be conveniently carried by travelers or others for temporary use in hotels and other similar localities.

The invention consists in a bar having lateral teeth engaging the door-jamb and adapted to be forced into place by the closing of the door and in braces adjustably disposed with relation to the bar to support it and prevent any displacement, all as hereinafter shown and described, and specifically pointed out in the claims.

In the drawings illustrative of the invention, Figure 1 is a longitudinal section illustrating the application of the device to a door and its jamb. Fig. 2 is a vertical section on the line $x$ $x$ of Fig. 1. Fig. 3 is a perspective view of the device detached.

The door is indicated at 5, the jamb at 6, and the inside stop at 7, all of the ordinary construction.

The securer consists in a flat bar 8, preferably of steel, with points or teeth 9 on its inner end projecting at angles thereto and with its outer end preferably formed into a wedge or chisel-like point 10, corresponding to one of the serrations or teeth 9, the function of the point 10 being to form the cavities in the jamb 5 for the teeth 9. By means of the point 10 when the implement is to be attached to a door the cavities for the teeth 9 may be first formed in the door-jamb to facilitate the operation of attaching the device. The chisel-point 10 is therefore an important adjunct to the instrument and greatly increases its efficiency.

Slidably disposed upon the bar 8 is a plate formed with a broad base portion 11, having grooves 12 engaging the edges of the bar 8, and an outwardly-curving portion 13, conforming in width with the bar and engaging by its outer end 14 rows of teeth 15 on the bar 8 near one end, as shown. The outer free end of the part 13 of the plate is formed with spaced spurs 14 at the sides engaging the teeth 15 and with a central inwardly-projecting tongue 16, adapted to engage the surface of the bar between the rows of teeth 15 and form a guide to retain the part 13 in engagement with the bar 8 and prevent lateral displacement. The broad base portion 11 rests upon the face of the door adjacent to the bar 8 and affords an ample support to the device and insures the requisite resistance to any strains to which the device may be subjected. The part 13 of the plate is provided with a longitudinal slot 17, through which a set-screw 18 fits and is tapped into the bar 8 to provide means for adjustably clamping the plate 11 13 and the bar 8 together. By this means the plate 11 13 may be adjusted upon the bar 8 and the points 14 caused to engage with any desired one of the teeth 15.

Connected by a hinged joint at 18 to the opposite side of the bar 8 from the teeth 15, near the outer end of the bar, is a plate 19, having rows of spaced ratchet-teeth 20, similar to the teeth 15 and terminating at its free end in inwardly-projecting hooks or guide-catches 21.

Slidably disposed upon the plate 19 and engaged by the catches 21 is another plate or bar 22, with spurs 23 on its free or outer end and with spaced spurs 24 on its upper end, adapted to engage the rows of spaced teeth 20, and with an inwardly-bending tongue 25, adapted to engage the body of the plate 19 between the rows of teeth 20 and affording lateral support to the slidable bar.

The bar 19 is provided with a longitudinal slot 26, through which a set-screw 27 fits and is tapped by its inner end into the hinged plate 19, whereby the bar 22 may be adjusted upon the plate 19 and clamped in any desired location thereon. The two parts 19 22 thus form an adjustable hinged brace capable of being set to brace the outer end of the bar 8 from the door-casing, as shown in Fig. 1. When thus adjusted, the spurs engage the door-casing and prevent slipping. The device can thus be set and adjusted to any door and will very effectually secure the door from being opened from the outside and forms a very cheap, simple, and convenient implement for the purpose for which it is designed.

When not in use, the brace member 19 20 will fold against the bar 8 and reduce the device to a small compass, which may be then stored in a small box for convenience of transportation.

Having thus fully described my invention, what I claim as new, and desire to secure by Letters Patent, is—

1. In a door-securer, the combination of a bar provided at one end with laterally-extending teeth to engage a door-jamb and provided near its other end with oppositely-extending serrated ribs, a plate having a laterally-extending abutting portion provided with grooves in which said bar is slidingly mounted, the opposite end of said plate having a curved notched portion to engage said serrated ribs, a set-screw engaging a threaded perforation in the bar and extending through a slot in the plate whereby the latter may be held at the desired adjustment with relation to said bar, and an adjustable brace hingedly connected with said plate, substantially as set forth.

2. In a door-securer, the combination with a plate having notched ribs and provided with means whereby it has sliding engagement with an extension-bar, of the said extension-bar having teeth engaging said notched ribs and an intermediate portion engaging between said ribs to prevent lateral displacement, means for retaining said plate and extension-bar in contact with each other at the desired adjustment, and an adjustable brace hingedly connected with said plate, substantially as set forth.

3. In a door-securer, a bar having lateral spurs on one end, a plate disposed adjustably upon said bar, on one side, a plate hinged by one end to the opposite side of said bar and with spaced serrations at the other end, an extension-bar engaging said serrations by one end and with spurs upon the other end, and means whereby said extension-bar may be clamped adjustably to said hinged plate, substantially as described.

In testimony that I claim the foregoing as my own I have hereto affixed my signature in the presence of two witnesses.

HECTOR PRUD'HOMME.

Witnesses:
  AMOS J. BELAND,
  EDWARD GARCEAU.